United States Patent
Easton

(10) Patent No.: US 7,130,862 B2
(45) Date of Patent: Oct. 31, 2006

(54) METHODS, SYSTEMS AND COMPUTER PROGRAM PRODCUTS FOR VALIDATION OF XML INSTANCE DOCUMENTS USING JAVA CLASSLOADERS

(75) Inventor: Wyn Gordon Easton, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 10/641,420

(22) Filed: Aug. 15, 2003

(65) Prior Publication Data
US 2005/0038816 A1   Feb. 17, 2005

(51) Int. Cl.
*G06F 17/30* (2006.01)
(52) U.S. Cl. ..................................... 707/102
(58) Field of Classification Search ............... 707/707, 707/1–10, 100–104.1; 370/401; 709/223
See application file for complete search history.

(56) References Cited

U.S. PATENT DOCUMENTS

| | | | |
|---|---|---|---|
| 6,317,742 B1 | 11/2001 | Nagaratnam et al. | 707/9 |
| 6,418,446 B1 | 7/2002 | Lection et al. | 707/103 |
| 2002/0191619 A1* | 12/2002 | Shafer | 370/401 |
| 2002/0198974 A1* | 12/2002 | Shafer | 709/223 |
| 2003/0093717 A1 | 5/2003 | Mason | 714/38 |

OTHER PUBLICATIONS

Namje Park et al., "Certificate validation service using XKMS for computational grid", (2003), ACM Press, NY NY, pp. I 112-120.*

* cited by examiner

*Primary Examiner*—Diane Mizrahi
(74) *Attorney, Agent, or Firm*—Myers Bigel Sibley & Sajovec, PA

(57) ABSTRACT

An Extensible Markup Language (XML) schema file can be resolved by receiving an XML instance document that includes data to be validated using an XML schema file at an XML validating system. The XML instance document can be parsed to map an external XML schema reference to the XML schema file defined by a source outside the XML validating system to an internal XML schema reference defined internal to the XML validating system. The internal XML schema reference can be resolved using a Java Classloader to provide the XML schema file as an input stream to the XML validating system. Related systems and computer program products are also disclosed.

29 Claims, 2 Drawing Sheets

METHODS, SYSTEMS AND COMPUTER PROGRAM PRODCUTS FOR VALIDATION OF XML INSTANCE DOCUMENTS USING JAVA CLASSLOADERS

FIELD OF THE INVENTION

This invention generally relates to the field of information processing and, more particularly, to methods, systems and computer program products for processing Extensible Markup Language documents.

BACKGROUND

It is known to validate data included in extensible mark-up language (XML) documents using XML schema files that describe how the data in the XML document is structured. For example, in some systems, an XML document can be validated by checking the structure of the data included in the XML document against an XML schema file which is accessed by the system. The XML schema file can be accessed by the system by either resolving the location of the XML schema file (i.e., finding the XML schema file itself) or by using a "hint" provided with the XML document that may indicate where the XML schema can be found, such as on a server accessible via the Internet.

Resolving the XML schema file using the system itself can be complicated because the system may be implemented on any one of a multiplicity of platforms (such as Linux, Windows, Unix, etc.). Accordingly, conventional systems may need to provide a way of resolving the XML schema file for each of the platforms on which the systems can be implemented. For example, if an XML validating system were implemented on a Unix system, the XML schema file may be stored according to the Unix file system, which may be different from other file systems on which the XML validation system may be implemented (such as Linux or Windows). Accordingly, the XML validation system may employ different processes for resolving the location of the XML schema file for each of these file systems.

Alternatively, if the location of the XML schema file is resolved using the hint provided in the XML document, the system may search for the XML schema file at a location outside of the system (such as on a server located on the Internet). As such, the XML schema file resolved by the system is assumed to be valid, which may raise security and/or other concerns regarding the authenticity of the XML schema file (such as the ultimate source of the file). Validation of XML documents is also discussed, for example, in U.S. Pat. No. 6,317,742 to Nagaratnam et al., in U.S. Pat. No. 6,418,446 to Lection et al., and in U.S. patent application Ser. No. 20030093717 by Mason, the disclosures of which are incorporated herein by reference.

SUMMARY

Embodiments according to the invention can provide methods, systems, and computer program products for resolving Extensible Mark-up Language (XML) schema files. Pursuant to these embodiments, an Extensible Markup Language (XML) schema file can be resolved by receiving an XML instance document that includes data to be validated using an XML schema file at an XML validating system. The XML instance document can be parsed to map an external XML schema reference to the XML schema file defined by a source outside the XML validating system to an internal XML schema reference defined internal to the XML validating system. The internal XML schema reference can be resolved using a Java Classloader to provide the XML schema file as an input stream to the XML validating system.

Because the XML validating system executes within a Java Virtual Machine (JVM), the Classloader which loaded the XML validating system can provide the XML schema file as an input stream using a Java Classpath associated with the Java Classpath as will be appreciated by those having skill in the art given the benefit of the current disclosure.

In some embodiments according to the invention, further resolving of the external XML schema reference can be prevented if the external XML schema reference fails to map to the internal XML schema reference. In some embodiments according to the invention, the parsing can include parsing the XML instance document to map the external XML schema reference to the internal XML schema reference using an application deployment descriptor.

In some embodiments according to the invention, the Java Classloader can be a Java Classloader used to load a current class for the validating system. In some embodiments according to the invention, the XML schema file is included in a Java Archive (JAR) file in a Java Virtual Machine. In some embodiments according to the invention, the XML validating system executes in a web container conforming to J2EE. In some embodiments according to the invention, the parsing can include parsing a schemaLocation attribute and invoking an entity resolver of the validating system to map the external XML schema reference to the internal XML schema reference.

DESCRIPTION OF EMBODIMENTS ACCORDING TO THE INVENTION

Figure 1:
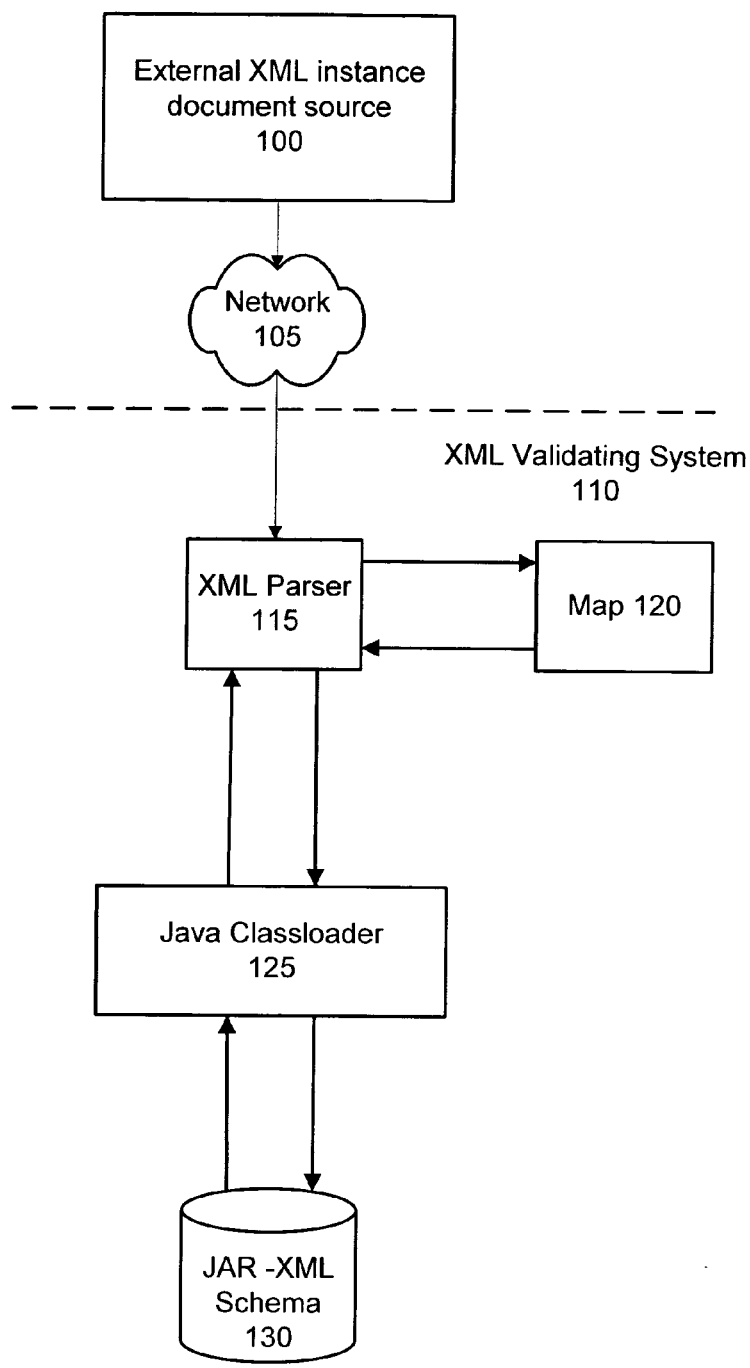
FIG. 1 is a block diagram that illustrates embodiments of methods, systems and computer program products for validation of XML instance documents according to the invention.

The invention is described herein with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers and reference designators refer to like elements throughout.

As will be appreciated by one of skill in the art, the present invention may be embodied as methods, systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code or "code" for carrying out operations according to the present invention may be written in an object oriented programming language such as JAVA®, or in various other programming languages. Software embodiments of the present invention do not depend on implementation with a particular programming language. Portions of the rode may execute entirely on one or more systems utilized by an intermediary server.

The code may execute entirely on one or more servers, or it may execute partly on a server and partly on a client within a client device or as a proxy server at an intermediate point in a communications network. In the latter scenario, the client device may be connected to a server over a LAN or a WAN (e.g., an intranet), or the connection may be made through the Internet (e.g., via an Internet Service Provider). It is understood that the present invention is not TCP/IP-specific or Internet-specific. The present invention may be embodied using various protocols over various types of computer networks.

The present invention is described below with reference to diagram illustrations of methods, systems and computer program products according to embodiments of the invention. It is understood that each block shown in the diagrams (i.e., block diagram and/or flowchart diagram), and combinations of blocks in the diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the diagram block or blocks.

These computer program instructions may be stored in a computer-readable memory that can direct a computer or other programmable data processing apparatus to function in a particular manner, such that the instructions stored in the computer-readable memory produce an article of manufacture including instruction means which implement the function specified in the diagram block or blocks.

The computer program instructions may be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the diagram block or blocks.

Embodiments according to the invention can provide methods, systems, and computer program products for resolving Extensible Mark-up Language (XML) schema files. In particular, embodiments according to the invention can use a Java Classloader to resolve a reference to an XML schema file to provide an input stream to a XML validating system. The input stream (of the XML schema file) can be used to validate data included in the XML instance document.

Because the XML validating system executes within a Java Virtual Machine (JVM), the Classloader which loaded the XML validating system can provide the XML schema file as an input stream using a Java Classpath associated with the Java Classpath as will be appreciated by those having skill in the art given the benefit of the current disclosure.

In particular, the XML schema file can be included in a Java Archive (JAR) file which can allow the Java Classloader to resolve the location of the XML schema file rather than providing an implementation of the system for each of the file systems on which the system is implemented as is done in conventional approaches. Accordingly, embodiments according to the invention can provide a portable technique that can resolve the location of the XML schema file on a platform that provides a JVM.

In further embodiments according to the invention, the XML instance document includes an externally defined reference to the XML schema file that is defined outside the XML validating system. The externally defined reference to the XML schema file is mapped to an internally defined reference to the XML schema file. Accordingly, the XML validating system maps the externally defined reference to internally defined reference that is resolved by the XML validating system to provide the XML schema file as an input stream.

In still further embodiments according to the invention, if the mapping from the externally defined XML schema reference to an internally defined XML schema reference fails (i.e., if the externally defined XML reference is not included in the map), the XML validating system prevents any further resolving of the XML schema reference. Rather, the validation process terminates by indicating, for example, the validation of the XML instance document has failed.

FIG. 1 is a block diagram that illustrates embodiments of methods, systems, and computer program products for resolving extensible mark-up language schema files according to the invention. In particular, an external XML source 100 generates an XML instance document that includes data, the structure of which, is to be validated by an XML validating system 110. The XML instance document can include data that is structured according to an XML schema file that is accessible by the XML validating system 110.

It will be understood that, the data included in the XML instance document can be used to produce any type of product or service. For example, in some embodiments according the invention, the data included in the XML instance document can be names, addresses, social security numbers, bank account numbers, etc. that correspond to customers of services provided by the source of the XML instance document, such as a Bank, that is providing the data for the production of "smart cards" for those customers.

It will be understood that the XML schema file can be used to validate the structure or organization of the data included in the XML instance document. It will be further understood that the XML schema file may not be used to determine whether or not the data included in the XML instance document is accurate. For example, in the application described above, the XML schema file may not be used to determine whether the data included in the XML instance document actually reflects the correct data associated with the particular customers included in the XML instance document.

As used herein, the term "XML" (Extensible Markup Language) refers to a standardized formatting notation based on the Standard Generalized Markup Language ("SGML"). SGML is an international standard for specifying document structure. (Refer to ISO 8879, "Standard Generalized Markup Language (SGML)", (1986) for more information on SGML.) XML is a simplified version of SGML, and was originally created as a markup language tailored for enabling structured document interchange on the Web. The syntax of XML is extensible, however, enabling it to be used to represent any type of structured information. One area in which XML is increasingly important is with on-line directories stored in data repositories such as those previously described. XML notation can be used to specify the format of records in a directory (as well as the values to be used in the records), and its extensibility makes it well-suited for use with dynamic schema.

When additional fields are to be added to a data record, the XML syntax representing those fields (and the corresponding values) can be specified for the record. For a record that does not need to use the added fields, the XML syntax merely omits specification of the additional fields. (Refer to "Extensible Markup Language (XML), W3C Recommendation Feb. 10, 1998" which is available on the World Wide Web at http://www.w3.org/TR/1998/REC-xml-19980210, for more information on XML. "XML" is a trademark of Massachusetts Institute of Technology.)

XML syntax is a programming language, where specially-designated constructs referred to as "tags" are used to delimit (or "mark up") information. In the general case, a tag is a keyword that identifies what the data is which is associated with the tag, and is typically composed of a character string enclosed in special characters. "Special characters" means characters other than letters and numbers, which are defined and reserved for use with tags. Special characters are used so that a parser processing the data stream will recognize that this a tag. A tag is normally inserted preceding its associated data: a corresponding tag may also be inserted following the data, to clearly identify where that data ends. As an example of using tags, the syntax "<email>" could be used as a tag to indicate that the character string appearing in the data stream after this tag is to treated as an e-mail address; the syntax "</email>" would then be inserted after the character string, to delimit where the e-mail character string ends. The extensibility of XML is provided by allowing users the capability to define their own tags. These user-defined tags then represent the particular data structure applicable for the user's data.

As used herein, the term "schema" can include a set of statements, expressed in a data definition language, that describe the structure of a document or data within a document or database. These statements can provide a logical view of the document or database structure, including the layout format of the document or database records as well as relationship information. The layout information includes which fields appear in each record, the data type for each field (such as whether it is numeric, binary, character, image, etc.). Relationship information specifies how various fields are related within the document. For example, for data that has a hierarchical structure, parent and child relationships are described in the schema. Schema files are described further, for example, in the International Business Machines ("IBM") Software Glossary, located for example, on the world-wide-web at networking.ibm.com/nsg.

Referring again to FIG. 1, the XML instance document includes an externally defined reference to the XML schema file. For example the externally defined reference to the XML schema file may be a file name known to the external source 100. It will be understood that the externally defined reference to the XML schema file can include other parameters as well.

The XML instance document is transmitted to the XML validating system 110 via a network 105 (such as the Internet). The XML validating system 110 can be an application that runs within a Java Virtual Machine (JVM) that is compliant wit Java 2 Platform, Enterprise Edition (J2EE) J2EE spec, which is located on the world-wide-web at: Java.sun.com/j2ee/, the disclosure of which is hereby incorporated herein by reference. Java 2 Enterprise Edition (J2EE) is a set of technologies and specifications developed by Sun Microsystems and supported by many computer and software vendors, including for example, IBM, BEA, and Oracle) as a leading platform for developing and deploying enterprise web applications. Accordingly, the XML validating system 110 may have access to all of the constructs and classes that are appurtenant to the JVM. The JVM, and the details associated therewith, are well understood by those having skill in the art and will not be discussed in great detail hereinafter.

It will be further understood that the XML validating system can include a number of applications which execute in a J2EE compliant web container environment. According to the J2EE specifications, containers are standardized runtime environments that provide specific component services. In addition, containers provide a mechanism for selecting application behaviors at assembly or deployment time. Through the use of deployment descriptors (text files that specify component behavior in terms of well-defined XML tags), components can be configured to a specific container's environment when deployed, rather than in component code. Features that can be configured at deployment time include security checks, transaction control, and other management responsibilities.

The XML validating system 110 parses the contents of the XML instance document using an XML parser 115. The parser 115 can be a Simple API for XML (SAX) parser, which is well known to those having skill in the art. SAX parsers are described in further detail, for example, on the world-wide-web at saxproject.org, and will not be discussed in farther detail. The parser 115 parses the contents of XML instance document to provide the XML schema file as an input stream against which the structure of the data included in the XML instance document is validated. In some embodiments according to the invention, the XML instance document includes a schemaLocation attribute that refers to the externally defined XML schema reference that can be resolved by invoking an entity resolver, which may be provided as part of the XML validating system.

When the parser 115 encounters an externally defined XML schema reference, the parser 115 refers to a mapping table 120 to map the externally defined XML schema reference to an internally defined XML schema reference. The mapping table 120 includes externally defined XML schema references and associated internally defined XML schema references. It will be understood that the internally defined XML schema reference may not be known by systems outside the validating system 110, such as the external XML source 100.

The mapping table 120 returns the internally defined XML schema reference to the parser 115 which may then be used to resolve the XML schema file to be provided as input to the XML validating system 110. If, however, the mapping table 120 does not include an entry for the externally defined XML schema reference, the XML validating system 110 may prevent any further resolving of the external XML schema reference. Accordingly, the use of a "hint" that may be provided by the external XML source 100 may be avoided, which may help to assure the integrity of the XML schema file that is ultimately resolved. For example, preventing further resolving of the externally defined XML schema reference may avoid the use of an XML schema file that is located outside the XML validating system 110 whose origin may be unknown.

In some embodiments according to the invention, the mapping table 120 can be provided as part of a Deployment Descriptor according to a Deployment Descriptor as defined in the J2EE specifications. In particular, the J2EE specifications specify a declarative programming model where many attributes (transaction requirements and semantics, security constraints and roles, lifecycle characteristics, persistence mechanisms, and other quality of service attributes of the Enterprise Application are included in ASCII XML files called Deployment Descriptors. Deployment Descriptors are used by the J2EE runtime execution environment to provide and enforce the quality of service attributes described in the Deployment Descriptors.

The parser 115 uses a Java Classloader 125 to resolve the XML schema file that is included in a Java Archive (JAR) file 130. In particular, the Java Classloader 135 may be the same Classloader that is used to load the XML validating system 110 in the Java Virtual Machine. Accordingly, the XML schema file may be included in a Classpath associated with the Java Classloader 135. The Java Classloader 135 may, therefore, use the associated Classpath to resolve the location of the XML schema file which may then be provided as input to the XML validating system thereby resolving the XML schema file according to embodiments of the invention.

It will be understood that, when an XML parser processes an XML file, it may read the file and construct a Document Object Model (DOM) tree based on the syntax of the tags embedded in the file and the interrelationships between those tags. It will be understood that DOM is a programming interface specification developed by the World Wide Web Consortium (W3C) which is described further on the Internet at: http://www.w3.org. In general, DOM is a platform and language-neutral interface that allows programs and scripts to dynamically access and update the content, structure and style of documents. The document can be further processed and the results of that processing can be incorporated into the presented page. With DOM, programmers can build documents, navigate their structure, and add, modify, or delete elements and content. Virtually, anything found in an HTML or XML document can be accessed, changed, deleted, or added using DOM.

It will be further understood that the JAR file 130 that includes the XML schema file can be digitally signed to provide further assurance of the authenticity of the XML schema file. By digitally signing the JAR file 130, it can become possible to enable an application, such as the XML validating system 110, that is constructed from class files associated with the archive file to access selected system resources via the Java Virtual Machine. Checking the digital signature of the JAR file 130 may, therefore, allow a determination as to whether the XML schema file, has been tampered with, and which computers have signed the applet.

In some embodiments according to the invention, the JAR file 130 includes a header signature which is the signature that may be typically used by a user agent to verify the validity of archive 130 and to determine the levels of access available to archive 130. In general, header signature can be a digital signature which may be a part of a general header that contains other information that includes, but is not limited to, information corresponding to the size of the archive 130. Additionally, archive 130 may have associated data blocks that may contain, for example, images, text, or any arbitrary data that is considered to be a part of archive 130. In some embodiments according to the invention, the data block may contain a text string that describes classes that are associated with archive 130.

Figure 2:
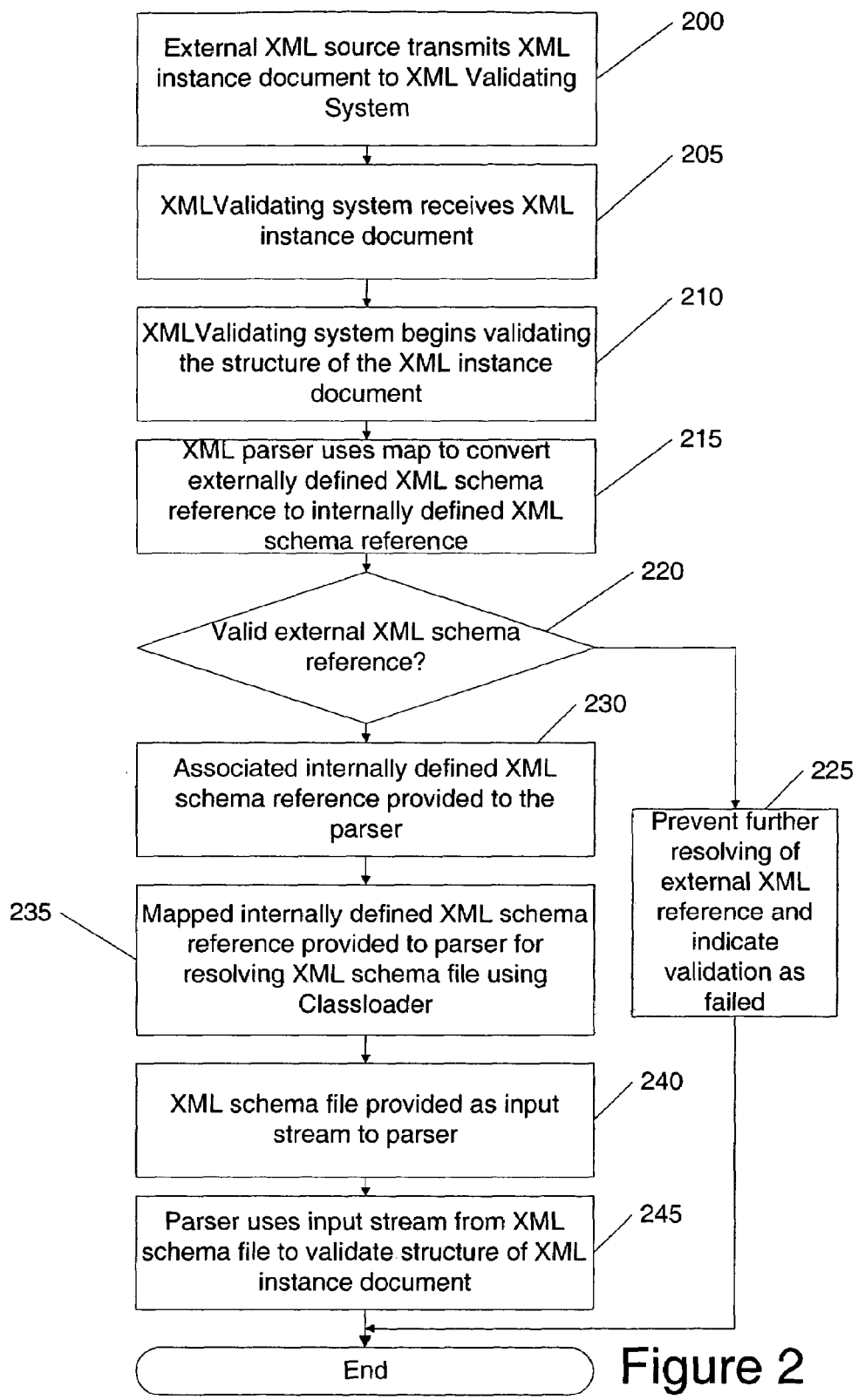
FIG. 2 is a flowchart diagram that illustrates operations of methods, systems and computer program products for validation of XML instance documents according to the invention.

FIG. 2 is a flowchart that illustrates operations of methods, systems, and computer program embodiments according to the invention. As shown in FIG. 2, an external XML source transmits an XML instance document to the XML validating system (block 200). The XML validating system receives the XML instance document (block 205) and begins validating the structure of the XML instance document (block 210). Upon encountering an externally defined XML schema reference in the XML instance document, a parser uses a map to convert the externally defined XML schema reference to an internally defined XML schema reference (block 215). In particular, the map is checked to determine whether the externally defined XML schema reference included in the XML instance document is included in the map (block 220). If the map does not include an entry corresponding the externally defined XML schema reference, the validation of the XML instance documents fails (block 225) and processing ends.

If the map does include an entry corresponding to the externally defined XML schema reference, the associated internally defined XML schema reference is provided to the parser (block 230) which uses the internally defined XML schema reference with a Java Classloader to resolve the location of the XML schema file included in a Java Archive (JAR) file (block 235). The XML schema file is provided as an input stream to the parser (block 240). The parser then uses the input stream from the XML schema file to validate the structure of the XML instance document (block 245).

As discussed above, embodiments according to the invention can provide methods, systems, and computer program products for resolving Extensible Mark-up Language (XML) schema files. In particular, embodiments according to the invention can use a Java Classloader to resolve a reference to an XML schema file to provide an input stream to a XML validating system. The input stream (of the XML schema file) can be used to validate data included in the XML instance document.

Because the XML validating system executes within a Java Virtual Machine (JVM), the Classloader which loaded the XML validating system can provide the XML schema file as an input stream using a Java Classpath associated with the Java Classpath as will be appreciated by those having skill in the art given the benefit of the current disclosure.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed:

1. A method of resolving Extensible Markup Language (XML) schema files comprising:
   receiving an XML instance document that includes data to be validated using an XML schema file at an XML validating system;
   parsing the XML instance document to map an external XML schema reference to the XML schema file defined by a source outside the XML validating system to an internal XML schema reference defined internal to the XML validating system; and
   resolving the internal XML schema reference using a Java Classloader to provide the XML schema file as an input stream to the XML validating system.

2. A method according to claim 1 wherein the step of resolving further comprises:
   preventing further resolving the external XML schema reference if the external XML schema reference fails to map to the internal XML schema reference.

3. A method according to claim 1 wherein the step of parsing comprises parsing the XML instance document to map the external XML schema reference to the internal XML schema reference using an application deployment descriptor.

4. A method according to claim 1 wherein the Java Classloader comprises a Java Classloader used to load a current class for the validating system.

5. A method according to claim 1 wherein the XML schema file is included in a Java Archive (JAR) file in a Java Virtual Machine.

6. A method according to claim 5 wherein the XML validating system executes in a web container conforming to J2EE.

7. A method according to claim 1 wherein the step of parsing comprises:
   parsing a schemaLocation attribute; and
   invoking an entity resolver of the validating system to map the external XML schema reference to the internal XML schema reference.

8. A method of resolving Extensible Markup Language (XML) schema files comprising:
   resolving an XML schema reference in an XML instance document using a Java Classloader to provide a XML schema file as an input stream to validate the XML instance document with the XML schema file.

9. A method according to claim 8 wherein the Java Classloader comprises a Java Classloader used to load a current class for an application performing the resolving of the XML schema reference.

10. A method according to claim 8 wherein the XML schema file is included in a Java Archive (JAR) file in a Java Virtual Machine executing an application performing the resolving of the XML schema reference.

11. A method according to claim 10 wherein the application executes in a J2EE compliant web container.

12. A method of resolving Extensible Markup Language (XML) schema files comprising:
    parsing an XML instance document to map an external XML schema reference to an XML schema file defined by a source of the XML instance document to an internal XML schema reference defined internal to an XML validating system configured to validate the XML instance document using the XML schema file.

13. A method according to claim 12 further comprising:
    preventing resolving the external XML schema reference if the external XML schema reference fails to map to the internal XML schema reference.

14. A method according to claim 12 wherein the step of parsing comprises parsing the XML instance document to map the external XML schema reference to the internal XML schema reference using an application deployment descriptor.

15. A method according to claim 12 wherein the step of parsing comprises:
    parsing a schemaLocation attribute; and
    invoking an entity resolver of the XML validating system to map the external XML schema reference to the internal XML schema reference.

16. A system for resolving Extensible Markup Language (XML) schema files comprising:
    means for receiving an XML instance document that includes data to be validated using an XML schema file at an XML validating system;
    means for parsing the XML instance document to map an external XML schema reference to the XML schema file defined by a source outside the XML validating system to an internal XML schema reference defined internal to the XML validating system; and
    means for resolving the internal XML schema reference using a Java Classloader to provide the XML schema file as an input stream to the XML validating system.

17. A system according to claim 16 wherein the means for resolving further comprises:
    means for preventing further resolving the external XML schema reference if the external XML schema reference fails to map to the internal XML schema reference.

18. A system according to claim 16 wherein the means for parsing comprises means for parsing the XML instance document to map the external XML schema reference to the internal XML schema reference using an application deployment descriptor.

19. A system according to claim 16 wherein the Java Classloader comprises a Java Classloader used to load a current class for the validating system.

20. A system according to claim 16 wherein the XML schema file is included in a Java Archive (JAR) file in a Java Virtual Machine.

21. A system according to claim 20 wherein the XML validating system executes in a web container conforming to J2EE.

22. A system according to claim 16 wherein the means for parsing comprises:
   means for parsing a schemaLocation attribute; and
   means for invoking an entity resolver of the validating system to map the external XML schema reference to the internal XML schema reference.

23. A computer program product for resolving Extensible Markup Language (XML) schema files comprising:
   a computer readable medium having computer readable program code embodied therein, the computer readable program product comprising:
   computer readable program code configured to receive an XML instance document that includes data to be validated using an XML schema file at an XML validating system;
   computer readable program code configured to parse the XML instance document to map an external XML schema reference to the XML schema file defined by a source outside the XML validating system to an internal XML schema reference defined internal to the XML validating system; and
   computer readable program code configured to resolve the internal XML schema reference using a Java Classloader to provide the XML schema file as an input steam to the XML validating system.

24. A computer program product according to claim 23 wherein the computer readable program code configured to resolve further comprises:
   computer readable program code configured to prevent further resolving the external XML schema reference if the external XML schema reference fails to map to the internal XML schema reference.

25. A computer program product according to claim 23 wherein the computer readable program code configured to parse comprises computer readable program code configured to parse the XML instance document to map the external XML schema reference to the internal XML schema reference using an application deployment descriptor.

26. A computer program product according to claim 23 wherein the Java Classloader comprises a Java Classloader used to load a current class for the validating system.

27. A computer program product according to claim 23 wherein the XML schema file is included in a Java Archive (JAR) file in a Java Virtual Machine.

28. A computer program product according to claim 27 wherein the XML validating system executes in a web container conforming to J2EE.

29. A computer program product according to claim 23 wherein the computer readable program code configured to parse comprises:
   computer readable program code configured to parse a schemaLocation attribute; and
   computer readable program code configured to invoke an entity resolver of the validating system to map the external XML schema reference to the internal XML schema reference.

* * * * *